United States Patent [19]
Katz et al.

[11] 3,917,520
[45] Nov. 4, 1975

[54] ELECTROLYSIS CELL SYSTEM AND PROCESS FOR GENERATING HYDROGEN AND OXYGEN

[75] Inventors: Murray Katz, Newington; Robert A. Sanderson, Wethersfield; John H. Hirschenhofer, Glastonbury, all of Conn.

[73] Assignee: United Technologies Corporation, Hartford, Conn.

[22] Filed: Nov. 20, 1974

[21] Appl. No.: 525,609

[52] U.S. Cl. .............. 204/129; 204/274; 204/277; 204/278; 136/86 R; 136/86 C
[51] Int. Cl.² ............................................. C25B 1/02
[58] Field of Search ........... 204/129, 274, 277, 278; 136/86 R, 86 C

[56] References Cited
UNITED STATES PATENTS
3,507,702   4/1970   Sanderson .......................... 136/86 C
3,779,811   12/1973  Bushnell et al. ................... 136/86 R

*Primary Examiner*—R. L. Andrews
*Attorney, Agent, or Firm*—Stephen E. Revis

[57] ABSTRACT

An electrolysis cell system includes a compact electrolysis cell comprising gas diffusion electrodes on each side of an aqueous electrolyte retaining matrix. A portion of the hydrogen gas produced by the cell is recirculated through the gas space of the cell and has water vapor added thereto to replenish the water used by the cell. A water metering device senses the amount of current supplied to the cell and adds the appropriate amount of water to the system in precisely the amount needed according to Faraday's law corrected to reflect water lost in the product gases leaving the system. In a preferred embodiment a separate coolant loop flows through a thermal exchange portion of the cell in a direction opposite the flow of the recirculating product gas through the cell thereby resulting in a temperature gradient across the cell which helps maintain an even concentration of electrolyte across the cell for most efficient cell operation.

The subject matter of this application is related to the subject matter of a commonly assigned application titled "Electrolysis Cell System Including a Recirculating Product Gas Stream for Cooling the Cell" by E. Parenti, D. Bloomfield, P. Grevstad and D. Beal, filed on even date herewith.

9 Claims, 2 Drawing Figures

ELECTROLYSIS CELL SYSTEM AND PROCESS FOR GENERATING HYDROGEN AND OXYGEN

The invention claimed herein was made under or during the course of a contract with the Department of the Air Force.

BACKGROUND OF THE INVENTION

1. Field of the Invention

This invention relates to electrolysis cells and more particular to a compact electrolysis cell system.

2. Description of the Prior Art

It is well known that it is possible to operate fuel cells in a reverse mode so that they generate hydrogen and oxygen when supplied with liquid water and electric power. Cells that operate in that manner are referred to as electrolysis cells. In one common type of electrolysis cell two solid electrodes which may, for example, be made from nickel, are spaced apart in a free liquid electrolyte and a potential is applied across the electrodes. Water in the electrolyte is electrolyzed liberating hydrogen and oxygen into the electrolyte in the form of gas bubbles. The water used is replenished by adding it directly to the liquid electolyte between the electrodes. Generally the electrolyte is also used to cool the cell; for example, a recirculating loop of electrolyte picks up waste heat from the cell, rejects this heat outside the cell, and then returns to the cell, makeup water being added somewhere in the loop. Another type of cell called the Bacon Cell utilizes two spaced apart dual porosity electrodes enclosing a free liquid electrolyte trapped in a sealed compartment. These elecctrodes may, for example, be made of sintered nickel. However, since both sides of the electrodes are metallic, electrolysis can occur in the electrolyte as well as on the gas side of the electrode. If this cell were to operate in a zero gravity environment, such as in a space craft, the gas in the electrolyte would have to be removed such as by the use of a liquid-gas vortex separator, thus complicating the design.

Although these electrodes could be modified so as to be made of inert material on the fine pore side exposed to the electrolyte to prevent gas formation within the bulk of the electrolyte, this type of cell would have to operate at relatively high temperatures. In either of the foregoing systems, wherein the electrolyte is a circulating or non-circulating free liquid disposed between or around the electrodes, and is not held within a matrix, each cell within a stack of cells would necessarily have be be fairly thick in order to either permit electrolyte to flow or to prevent the electrodes from touching.

It is often desirable that an electrolysis cell be as compact as possible. Thus, it would be desirable to use, as an electrolysis cell, a fuel cell similar to the type shown in FIG. 2 of Sanderson U.S. Pat. No. 3,507,702 or Bushnell, et al., U.S. Pat. No. 3,779,811, both of common assignee with the present application. In the type of cell shown in Sanderson the electrolyte is held in a matrix trapped between partially hydrophobic partially hydrophilic gas diffusion electrodes; a gas space is formed on the nonelectrolyte side of each electrode for carrying the oxidant and fuel. The matrix is usually of very fine pore structure with a high resistance to bubble formation in the electrolyte. This type of cell is very thin compared to the earlier mentioned type since there is no requirement that the electrolyte must be pumped through the system, and therefore the electrodes may be spaced very close to each other. In the fuel cell system of Sanderson there is a separate coolant loop for carrying a liquid cooling through the fuel cell to remove waste heat therefrom. Also, moisture is added to the air entering the cathode side of the fuel cell to provide a positive means of fuel cell water balance control over the range of ambient temperature and humidity expected. In an electrolysis cell water is continuously being used up and must therefore be continuously supplied. Of course, if an electrolysis cell system used a cell constructed similar to the cell of FIG. 2 in Sanderson there would not be the usual circulating electrolyte for water addition. In Sanderson water is brought into the cell in the incoming air stream. But, in an electrolysis cell system the electrolysis cell produces oxygen and hydrogen and thus there would be no incoming reactant gas stream for carrying water vapor to the cell as there is in Sanderson. In any event, Sanderson adds water merely to prevent dryout of the electrolyte matrix near the inlet thus providing for more uniform water removal. There is no means for providing the proper amount of water input if the Sanderson system were an electrolysis system using up water.

SUMMARY OF THE INVENTION

An object of the present invention is an improved electrolysis cell system utilizing a compact design electrolysis cell.

Another object of the present invention is an electrolysis cell system with an improved and simplified means for introducing and controlling the amount of water provided to the cell.

Accordingly, the present invention is an electrolysis cell system including an electrolyte matrix sandwiched between a pair of gas porous electrodes wherein one of the products of electrolysis recirculates through the cell and has water added thereto in vapor form to replenish the water used by the cell, the amount of water added being controlled by the amount of current supplied to the cell. In a preferred embodiment the water is vaporized by the waste heat from the cell and means is provided to maintain a temperature gradient across the cell wherein the cell is hotter where the moist recirculating gas stream enters the cell and is cooler where it leaves the cell (i.e., counter-current gas and coolant flow) thereby helping to maintain as small an electrolyte concentration gradient across the cell as possible. Also, in a preferred embodiment, a liquid coolant is circulated through the thermal exchange portion of the cell to create the temperature gradient thereacross and to pick up waste heat from the cell. The temperature of the coolant fluid entering the cell is controlled by a bypass conduit which includes means for rejecting heat to a heat sink. The hot coolant passes in indirect heat exchange relationship with the water being added to the cell and vaporizes this water into the recirculating product gas stream.

Faraday's law tells us that there is a linear proportionality correspondence between the current input to the cell and the amount of water used by the cell to produce hydrogen and oxygen. Thus the amount of reactant water added may be controlled solely by the current input into the cell thereby eliminating the need for temperature and dew point sensors to maintain the proper partial pressure of water in the gas stream flowing through the cell.

The foregoing and other objects, features and advantages of the present invention will become more apparent in the light of the following detailed description of preferred embodiments thereof as illustrated in the accompanying drawing.

DESCRIPTION OF THE PREFERRED EMBODMENTS

Figure 1:
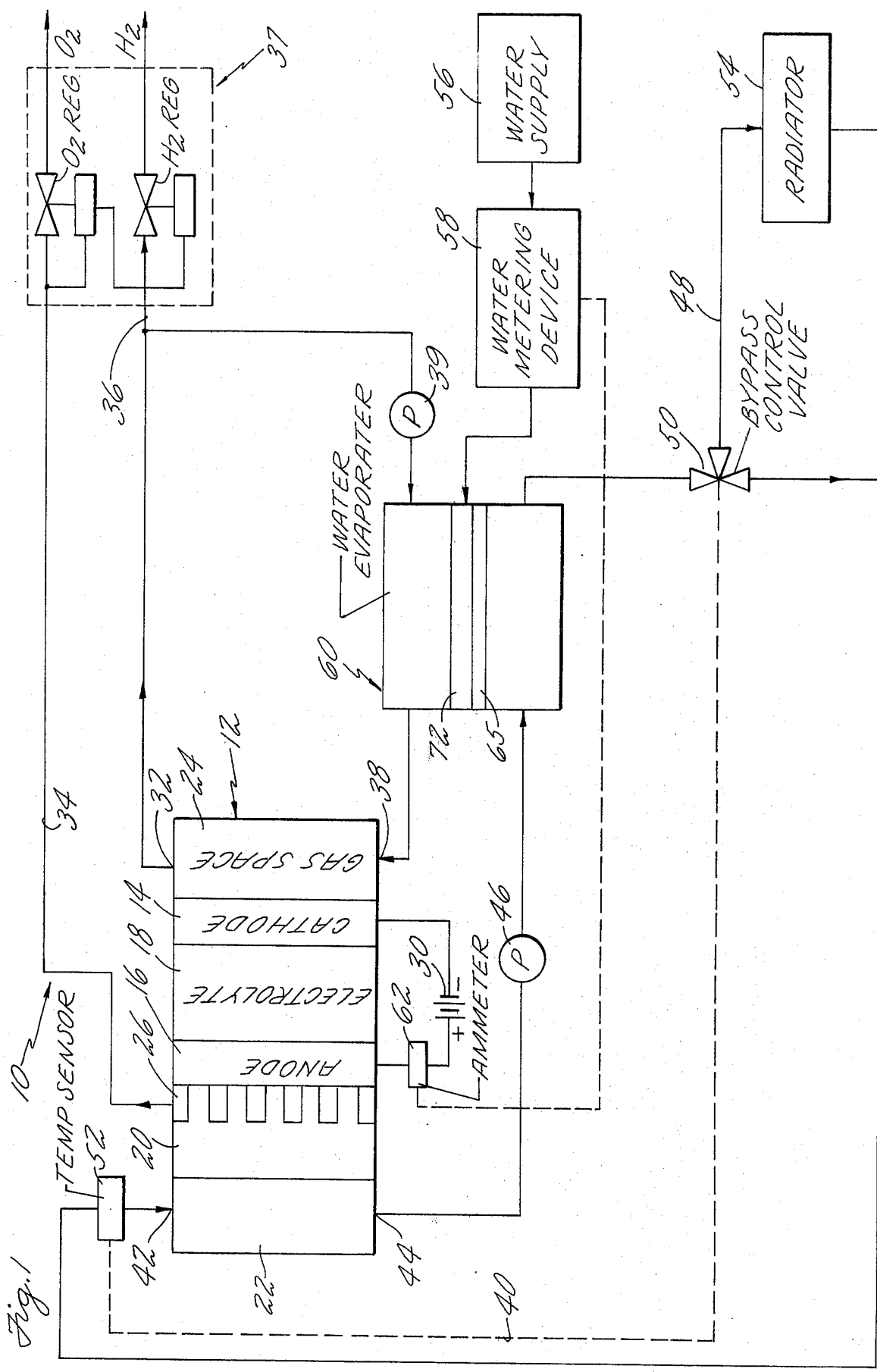
FIG. 1 is a schematic of an electrolysis cell system according to the present invention.

Referring to FIG. 1, an electrolysis cell system 10 according to a preferred embodiment of the subject invention is shown. The system 10 comprises an electrolysis cell 12. Only one cell 12 is shown, however, any number of cells may be combined to form a multi-cell stack which could be used in the system. The cell 12 is represented schematically as comprising a cathode 14, an anode 16, a porous matrix 18 sandwiched therebetween and filled with an aqueous electrolyte, a porous backup plate 20 adjacent the anode 16, and a thermal exchange portion 22. The cell also includes gas spaces 24, 26 on the nonelectrolyte side of the cathode and anode, respectively. The thermal exchange portion 22 may be of any well known construction suitable for passing a cooling fluid therethrough for removing heat from the cell 12. For example, it may be a plate having cooling fluid passages therethrough. The plate with its attendant passages would be configured and arranged so that heat generated in the cell during operation thereof is transferred to the fluid passing through the passages in a manner well known to those skilled in the art. The porous backup plate 20 serves as an electrolyte reservoir, in a manner well known to those skilled in the art, thereby allowing large variations in the electrolyte volume without flooding or drying of the electrodes. If the electrolysis cell system 10 were required to operate in only a narrow power range then a porous backup plate 20, which is also sometimes known as an electrolyte storage matrix, may not be required.

In this embodiment, a base electrolyte such as KOH is contemplated although it should be apparent to persons with ordinary skill in the art that the system of the present invention is equally as applicable to acid cells. It is also contemplated that the electrodes are of the gas porous type and may comprise, for example, a metal support screen or mesh in intimate contact with a catalyst layer preferably comprising an admixture of catalyst and hydrophobic polymer binder. Although the specific material of which the electrodes are made and their construction is not considered critical to the present invention, it is required that the electrodes be gas porous so that produce gas bubbles are not retained in the electrolyte and so that process water may be added in vapor form from the nonelectrolyte side of the electrodes. Electrodes of this type are commonly referred to as gas diffusion electrodes, and are suitable for either terrestrial or zero-gravity operation. A cell of the type just described and which may be used in the system 10 of the present invention is shown in FIG. 1 of Bushnell, et al., U.S. Pat. No. 3,779,811 and is incorporated herein by reference, although the present invention is not limited to that precise configuration.

During operation an electric potential is applied by a power source 30 causing electrolysis of the water fraction of the electrolyte within the matrix 18 and liberating oxygen from the gas space 26 on the anode side of the cell and hydrogen from the outlet 32 of the gas space 24 on the cathode side of the cell. In this embodiment all of the oxygen and a portion of the hydrogen is removed from the cell for either storage or immediate use through conduits 34, 36, respectively. These product gases pass through pressure regulating means 37 for maintaining substantially equivalent pressures within the gas spaces 24 and 26 which is usually necessary for proper operation of the cell as is well known in the art. A portion of the hydrogen produced is recirculated through the cell by a pump 39. The recirculated portion of the hydrogen reenters the gas space 24 at the inlet 38 thereof. Although in this embodiment hydrogen is recirculated, it will become apparent to persons with ordinary skill in the art that the oxygen could be recirculated instead.

Heat is removed from the cell by a recirculating loop 40 of coolant fluid which passes through the thermal exchange portion 22. In this embodiment the coolant fluid is a liquid silicon oil, but the particular coolant used is not critical to the present invention. The coolant enters the entrance 42 of the thermal exchange portion 22 and picks up heat generated by the fuel cell as it passes therethrough. It leaves by an exit 44 and is pumped around the loop by a pump 46. The loop 40 also includes a bypass loop 48, a bypass control valve 50 and a thermal sensing element 52. The bypass loop 48 includes heat rejection means 54. The thermal sensing element 52 is positioned to measure the temperature of the coolant fluid entering the thermal exchange portion 22 at the entrance 42. The bypass control valve 50 is responsive to the thermal sensing element 52 and opens and closes accordingly to permit the proper proportion of coolant fluid to pass through the heat rejection means 54 in order to maintain a predetermined temperature of the coolant fluid entering the entrance 42. As hereinafter explained it is desirable to maintain a temperature gradient across the cell wherein the temperature on the side of the cell having the inlet 38 is higher than the temperature on the side of the cell having the outlet 32. This will be the case in the embodiment shown since the exit 44 of the thermal exchange portion 22 is on the same side of the cell as the inlet 38 to the gas space 24. Thus the coolant flows through the cell 12 counter to the recirculating hydrogen gas. As the moist hydrogen stream enters the inlet 38 and moves past the cathode more and more water is removed from the stream resulting in a decrease in the water partial pressure of the gas stream from the hot inlet 38 to the cool exit 32. The fact that the equilibrium partial pressure of water vapor over the electrolyte and partial pressure of water vapor in the gas stream both decrease from the inlet 38 to the outlet 32 helps to maintain, as close as possible, an even concentration of electrolyte across the cell for most efficient cell operation.

As hereinbefore explained an electrolysis cell produces oxygen and hydrogen from water and electric power. The system 10 includes a water storage compartment 56 in communication with a water metering device 58. The device 58 supplies water to the recirculating hydrogen stream in a sufficient quantity to replace the water used by the cell and to replace water that exists with the gases flowing through conduits 34, 36. In this embodiment liquid water is fed to a water evaporator 60. The water enters the evaporator 60 and is converted to vapor which passes into the recirculating hydrogen stream. The heat to vaporize the water is supplied by the hot liquid coolant leaving the thermal exchange portion 22. This coolant passes through the water evaporator 60 and gives up some of its heat thereto in order to evaporate the water.

Figure 2:
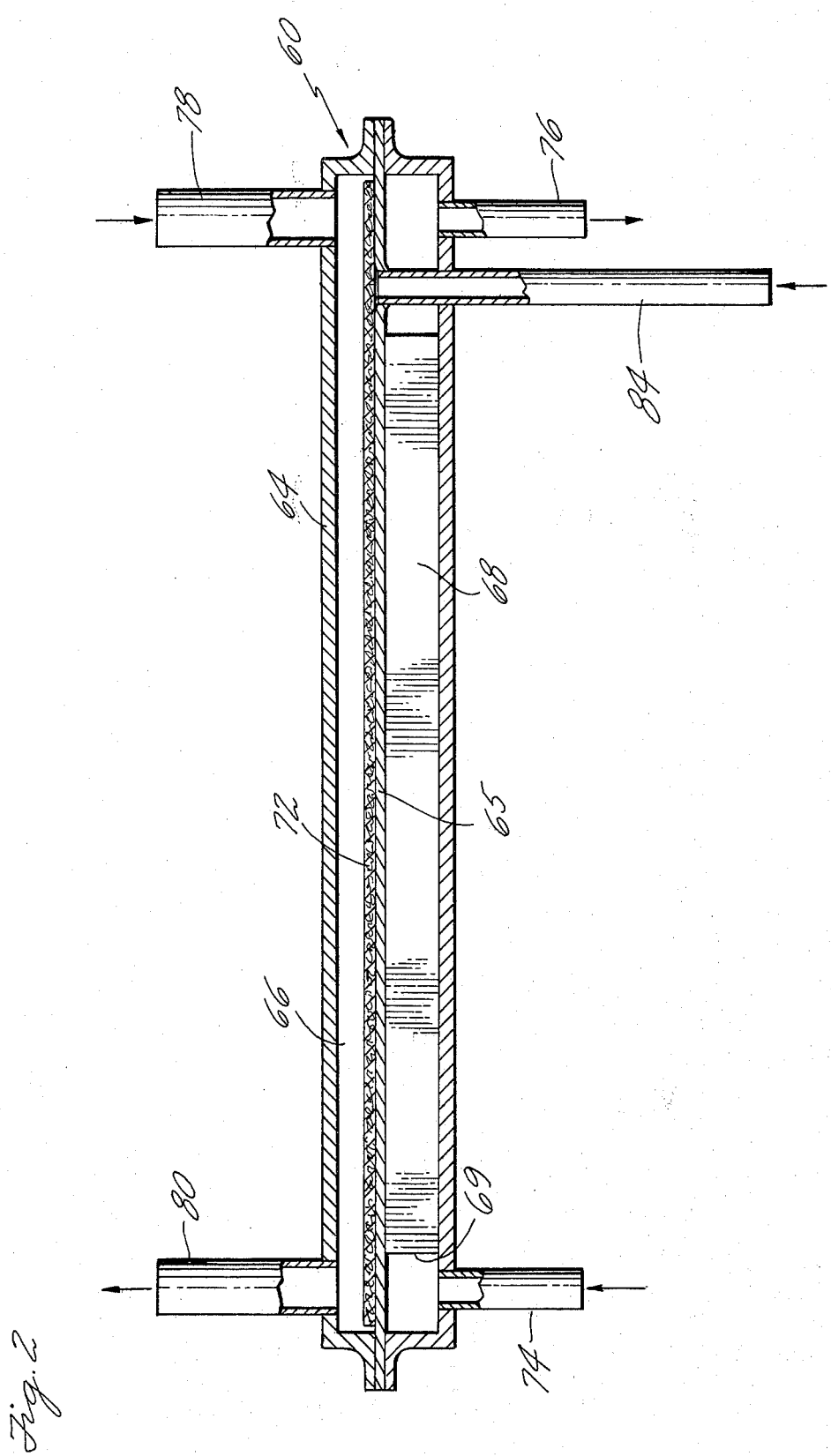
FIG. 2 is a simplified representation of a water evaporator which may be used in the system of the subject invention.

The water evaporator used in the system 10 of the present invention is shown in FIG. 2 and is suitable for zero-gravity operation as well as for terrestrial operation. The evaporator 60 comprises an outer casing 64 divided by a plate 65 into a gas compartment 66 and a coolant compartment 68. The gas compartment side of the plate 65 is covered by a wick 72, and the coolant compartment 68 includes a plurality of fins 69. The coolant enters the inlet 74 of the coolant compartment 68, passes over the fins 69, and leaves the compartment 68 by an outlet 76. The fins 69 are designed to pick up the heat from the coolant and transfer it to the plate 65 which thus becomes hot. The moist recirculating hydrogen stream enters the inlet 78 of the gas compartment 66, passes over the wick 72, and leaves the compartment 66 by an outlet 80. Water from the water metering device 58 enters the evaporator 60 through inlet conduit 84. Due to capillary action, the wick 72 absorbs the water and holds the water directly against the hot surface of the plate 70 thus providing the maximum temperature and therefore the maximum partial pressure gradient for mass transfer of water to the humid hydrogen gas stream flowing over the wick 72. The fins 69 may be, for example, of copper and the wick may be made of porous nickel in order to maintain a high evaporation surface temperature. In this system it is necessary that all the water added to the recirculating hydrogen stream be in vapor form since it is difficult to distribute liquid water to a multi-cell stack, and in addition liquid water may cause flowing of the electrode. For these reasons and to prevent dryout of the electrodes, the evaporator 60 is sized and designed to be able to evaporate water at least as fast as it is supplied from the metering device 58.

An important feature of this invention is the manner in which the proper amount of water is added to the recirculating hydrogen stream. From Faraday's law it is known that an electrolysis cell will use one gram-equivalent of water for each 96,500 coulombs of current supplied to the cell. The amount of water that leaves with the oxygen and hydrogen streams through conduits 34, 36 is dependent on the temperature at which the cell is run and does not vary with the current supplied to the cell. In the system 10 an ammeter or current sensing element 62 is put into the circuit with the fuel cell 12 and power supply 30 for sensing the amount of current passing through the cell 12. The water metering device 58 is responsive to the current sensed by the current sensing element 62 and adds water in direct proportion to the current according to Faraday's law corrected for the temperature of the fuel cell in order to account for the water leaving in the gas stream as well as the water used during the electrolysis process. This system automatically compensates for changes in the amount of current supplied to the cell 12.

Although the invention has been shown and described with respect to a preferred embodiment thereof it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. An electrolysis cell system for producing hydrogen and oxygen comprising:
    at least one electrolysis cell including a pair of gas diffusion electrodes spaced apart, matrix means for retaining an aqueous electrolyte in the space between said electrodes, means forming a gas space on the nonelectrolyte side of each electrode, one of said gas spaces including inlet means and outlet means, said cell also including a thermal exchange portion having entrance means and exit means;
    means for supplying current to said cell;
    current measuring means for measuring the current supplied to said cell;
    means for recirculating a portion of one of said product gases from said outlet means, to said inlet means and through said gas space;
    coolant loop means including a liquid coolant circulating through said thermal exchange portion of said cell to remove heat from said cell and to maintain a temperature gradient across said cell, said gas space inlet means positioned at the high temperature side of said cell and said gas space outlet means positioned at the low temperature side of said cell; and
    water supply means for supplying water in vapor form into the recirculating product gas stream, including water evaporator means and water metering means, said water metering means being responsive to said current measuring means to supply water to said evaporator means at the rate needed by said system, said water evaporator means including means for vaporizing all of said supplied water into said recirculating product gas stream at the same rate as it is supplied to said evaporator means.

2. The electrolysis cell system according to claim 1 wherein said evaporator means includes means for bringing all of said supplied water into indirect heat exchange relationship with said coolant wherein the heat of vaporization is provided by said coolant.

3. The electrolysis cell system according to claim 1 wherein said means for vaporizing all of said supplied water comprises a gas compartment for carrying said recirculating product gas through said evaporator means including wick means for absorbing all the supplied water, and a coolant compartment for carrying said coolant through said evaporator means into heat exchange relationship with said wick means for evaporating the water within said wick into said recirculating product gas stream.

4. The electrolysis cell system according to claim 2 including:
    thermal sensing means for sensing the temperature of said liquid coolant as it enters said thermal exchange portion of said cell;
    bypass loop means comprising heat rejection means;
    bypass control valve means operable in response to said thermal sensing means to route the necessary amount of said liquid coolant through said bypass loop means to maintain a predetermined temperature of said liquid coolant as sensed by said thermal sensing means; and
    pressure regulator means for maintaining substantially equivalent product gas pressures in said gas spaces of said cell.

5. The electrolysis cell system according to claim 4 wherein said recirculating product gas is hydrogen.

6. In the process of generating hydrogen gas and oxygen gas in the electrolysis cell wherein the cell includes a pair of gas diffusion electrodes spaced apart, matrix means for retaining an aqueous electrolyte in the space between said electrodes, means forming a hydrogen gas space on the non-electrolyte side of one of said pair of electrodes and an oxygen space on the nonelectrolyte side of the other of said pair of electrodes, and a thermal exchange portion, the steps of:

supplying current to said cell;

recirculating a portion of one of the gases produced by said cell through its respective gas space;

maintaining a temperature gradient across said cell wherein the recirculating gas stream enters said gas space at the high temperature side of said cell and leaves said gas space at the low temperature side of said cell including the step of circulating a liquid coolant through said thermal exchange portion of said cell in a direction counter to the flow of said recirculating gas stream through said gas space;

supplying water to said electrolysis cell at a rate directly proportional to the current supplied to said cell and in an amount equal to the amount used by said cell plus the amount leaving said cell in the non-recirculating product gases, said step of supplying water to said cell including the step of vaporizing into the recirculating gas stream all of the water supplied before the water enters the gas space of the cell.

7. The process according to claim 6 wherein the step of vaporizing includes the step of passing the circulating coolant in heat exchange relationship with the water supplied to provide the heat of vaporization.

8. The process according to claim 6 wherein the step of maintaining a temperature gradient across said cell includes the step of maintaining a predetermined temperature of said liquid coolant at the entrance of the thermal exchange portion of the cell; and maintaining substantially equivalent product gas pressures in the gas spaces of the cell.

9. The process according to claim 6 wherein the step of recirculating a portion of one of said product gas includes recirculating hydrogen.

* * * * *

UNITED STATES PATENT OFFICE
CERTIFICATE OF CORRECTION

PATENT NO. : 3,917,520
DATED : November 4, 1975
INVENTOR(S) : Murray Katz et al

It is certified that error appears in the above-identified patent and that said Letters Patent are hereby corrected as shown below:

Column 1, line 33 - "elecctrodes" should read --electrodes--

Column 2, line 3 - "cooling" should read --coolant--

Column 4, line 65 - "exists" should read --exits--

Column 5, line 35 - "flowing" should read --flooding--

Claim 6, column 7, line 9 - after the word "oxygen" insert --gas--

Signed and Sealed this tenth Day of February 1976

[SEAL]

Attest:

RUTH C. MASON
Attesting Officer

C. MARSHALL DANN
Commissioner of Patents and Trademarks